(12) United States Patent
Schumann et al.

(10) Patent No.: US 10,247,253 B2
(45) Date of Patent: Apr. 2, 2019

(54) COMPONENT GROUP WITH A FRICTIONAL DEVICE

(71) Applicant: Schaeffler Technologies AG & Co. KG, Herzogenaurach (DE)

(72) Inventors: Lars Schumann, Buehl (DE); László Mán, Ottersweier-Unzhurst (DE); Peter Greb, Ottersweier (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 346 days.

(21) Appl. No.: 15/022,773

(22) PCT Filed: Sep. 18, 2014

(86) PCT No.: PCT/DE2014/200480
§ 371 (c)(1),
(2) Date: Mar. 17, 2016

(87) PCT Pub. No.: WO2015/048961
PCT Pub. Date: Apr. 9, 2015

(65) Prior Publication Data
US 2016/0230814 A1    Aug. 11, 2016

(30) Foreign Application Priority Data

Oct. 1, 2013    (DE) .................. 10 2013 219 862

(51) Int. Cl.
*F16H 25/22*    (2006.01)
*F16D 13/50*    (2006.01)
*F16D 13/08*    (2006.01)
*F16D 28/00*    (2006.01)
*F16D 29/00*    (2006.01)

(52) U.S. Cl.
CPC ............. *F16D 13/50* (2013.01); *F16D 13/08* (2013.01); *F16D 28/00* (2013.01); *F16D 29/005* (2013.01)

(58) Field of Classification Search
USPC ....................................... 74/424.92
See application file for complete search history.

(56) References Cited

U.S. PATENT DOCUMENTS

| 2,510,653 A |   | 6/1950 | Pepper |
| 3,242,696 A | * | 3/1966 | Kaplan ................... F16D 7/022 192/41 R |
| 4,246,991 A | * | 1/1981 | Oldakowski ............ B64C 13/28 192/12 BA |

(Continued)

FOREIGN PATENT DOCUMENTS

| CN | 201377534 | 1/2010 |
| CN | 102597398 | 7/2012 |

(Continued)

*Primary Examiner* — Robert W Hodge
*Assistant Examiner* — Ryan P Dodd
(74) *Attorney, Agent, or Firm* — Brooks Kushman P.C.

(57) ABSTRACT

Embodiments of the present invention relate to a component group with a friction device with at least two components that are rotatable relative to one another, in particular for actuating a clutch of a vehicle, wherein a coil spring influencing the degree of efficiency, the friction is disposed between the components that are rotatable relative to one another and wherein the component group with a friction device is integrated in a transmission or an actuator, or both.

17 Claims, 15 Drawing Sheets

(56) References Cited

U.S. PATENT DOCUMENTS

| | | | | |
|---|---|---|---|---|
| 4,364,286 A * | 12/1982 | Ciolli | ............ | B25F 5/001 |
| | | | | 188/134 |
| RE33,514 E * | 1/1991 | Ciolli | ............ | B25B 23/14 |
| | | | | 192/150 |
| 5,287,949 A | 2/1994 | Kitamura | | |
| 5,983,743 A * | 11/1999 | McGregor | ............ | F16D 27/105 |
| | | | | 251/129.13 |
| 9,051,974 B2 | 6/2015 | Gramann et al. | | |
| 2007/0123380 A1 | 5/2007 | Ishida et al. | | |
| 2007/0137966 A1* | 6/2007 | Francis | ............ | B60K 17/02 |
| | | | | 192/20 |
| 2013/0081588 A1* | 4/2013 | Antchak | ............ | F02N 15/022 |
| | | | | 123/179.1 |

FOREIGN PATENT DOCUMENTS

| | | |
|---|---|---|
| DE | 102007047394 | 4/2008 |
| DE | 102010047800 | 5/2011 |
| DE | 102012209883 | 1/2013 |
| EP | 0119823 | 9/1984 |
| EP | 0320621 | 6/1989 |
| EP | 0724934 | 8/1996 |
| FR | 2283357 | 3/1976 |
| JP | 2008185079 | 8/2008 |
| WO | 2011015497 | 2/2011 |

\* cited by examiner

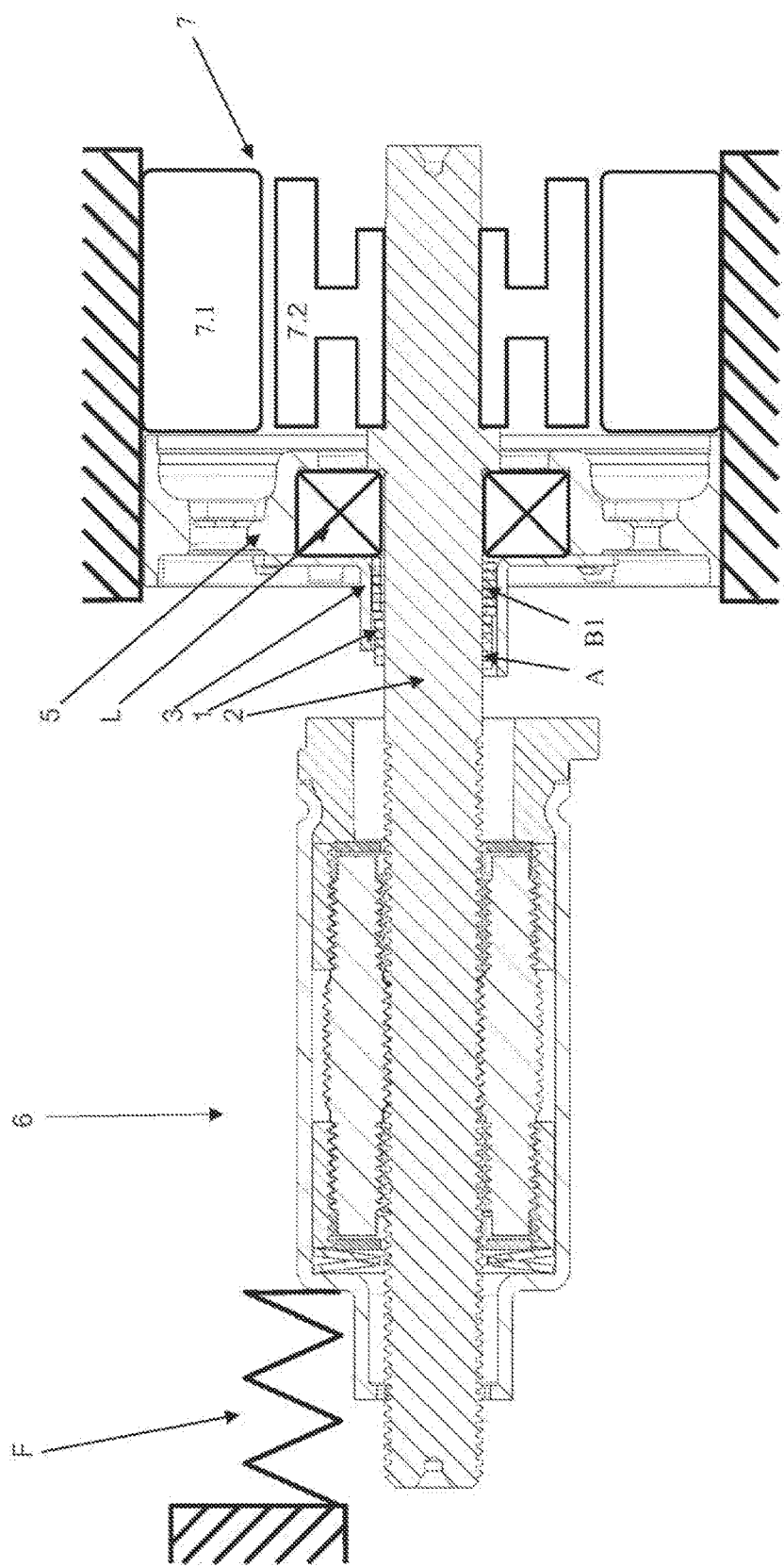

COMPONENT GROUP WITH A FRICTIONAL DEVICE

CROSS-REFERENCE TO RELATED APPLICATIONS

The present application is the United States National Stage Application pursuant to 35 U.S.C. § 371 of International Patent Application No. PCT/DE2014/200480, filed on Sep. 18, 2014, and claims priority to German Patent Application No. DE 10 2013 219 862.0 of Oct. 1, 2013, which applications are incorporated by reference in their entireties.

FIELD OF THE INVENTION

The invention relates to a component group with a frictional device having at least two components that are capable of rotating relative to one another, in particular for use in a transmission and/or in an actuator.

Actuators are used to operate a clutch in a vehicle, for instance, and are capable of converting a rotary movement of one component into an axial movement of another component.

BACKGROUND OF THE INVENTION

The published German Patent Application DE 10 2012 209883 A1 discloses a lever system for operating a torque transmission device such as a clutch in a drive train of a motor vehicle. The lever system comprises a lever supported in a bearing location to rotate about a joint and having a force introduction location that is movable in parallel with the axis of rotation of the torque transmission device. The force introduction location is in effective connection with an operating actuator. The actuator itself may be any type of linear actuator, for instance a planetary roller spindle drive actuator (PWG), a hydraulic slave cylinder, etc. Planetary roller spindle drives (PWG) are formed of a spindle, a spindle nut and planetary rolling bodies disposed there between along the circumference in a planet carrier. The spindle, spindle nut and planetary rolling bodies have profiles to transmit a rotary movement between the spindle and the spindle nut. One of the components, for example the spindle or spindle nut, is driven to rotate and the other component is fixed along the longitudinal axis of the spindle against relative rotation and is moved through an axial path as a function of the set transmission ratio. The planetary rolling bodies have two different profile sections, meshing with the spindle on the one hand and with the spindle nut on the other hand. The one profile sections on the planetary rolling body are groove-shaped and the other profile sections on the planetary rolling body are generally groove-shaped and, depending on the embodiment, a complementary thread section is provided on the spindle or on the spindle nut and the groove section is provided on the other component in a corresponding way. Compared to a direct arrangement of the spindle on the spindle nut, this arrangement provides transmission ratios that allow a higher force for every revolution of the spindle with a shorter feed motion.

EP 320 621 A1 for instance discloses a PWG wherein the spindle has a thread and the spindle nut has grooves on which respective planetary rolling bodies roll off by means of corresponding profiled sections of complementary design. The spindle, which is axially fixed and driven to rotate by an electric motor, for instance, is rotated relative to the spindle nut, which is fixed against relative rotation, in a way to force the spindle nut to be axially displaced due to the frictional rolling of the planetary bodies in the grooves of the spindle nut. Via the axial displacement of the spindle nut, this results in a movement that is proportional to the rotary speed of the spindle. For this purpose, in a manner corresponding to planetary gears, the planet carrier with the planetary rollers rotates at half the rotary speed or at a different ratio, depending on the diameters of the rotating component, namely the spindle or spindle nut.

DE 10 2010 047 800 A1 discloses an application of a planetary gear set wherein an actuator part of a hydrostatic actuator, the actuator part embodied as a piston of a master cylinder, is coupled in an axially fixed way with the spindle, which is disposed to be fixed against relative rotation and axially movable. The axially fixed spindle nut is driven to rotate by an electric motor so that when the spindle nut is rotated, the spindle and spindle nut are displaced relative to one another along the axial path. As the cylinder housing receiving the piston and forming a pressure chamber with the latter is fixed and the spindle nut is axially supported thereon, depending on the rotary driving of the spindle nut, the piston builds up a pressure for instance for actuating motor vehicle components such as brakes, friction clutches and the like. In this context, it is desirable especially for friction clutches to quickly overrun a clearance with low load requirement by means of a high pitch and in the region of operation of the friction clutch to be able to apply high loads using a low-power electric motor by means of a small pitch.

In particular in actuators such as hydrostatic clutch actuators (HCA) that operate against a load, for instance a clutch characteristic curve, a problem of spindle drives (e.g. PWGs) that are driven by an electric motor, for instance, and are optimized in terms of their degree of efficiency, is that when a position needs to be held, a holding current and thus a holding torque is required in the electric motor because the spindle drive (e.g. in a PWG) is not self-locking. In a PWG in a HCA with a ring gear nut that is fixed against relative rotation and a driven spindle from which the axial movement (relative to the spindle) is taken, in the case of an ideal rolling movement (like in a splined planetary gear/no slip), an additional transmission of the spindle pitch occurs, which is freely selectable within limits by varying the spindle and/or planetary roller diameters.

A decisive disadvantage of actuators of this type is that they require a continuous holding current and that the position cannot be held in the case of a power failure/malfunction (cable break/plug power dip). A clutch that is pushed open by the actuator then risks closing unintentionally.

In addition, it is known to use of wrap springs, for instance, in clutches. The wrap spring clutch consists of a coil spring that is wound onto a shaft or a cylindrical body and is fixed to the drive on one side. The entrainment effect is based on the fact that the entrainment moment increases and adds up with each revolution due to friction. As a result, the force creating the friction increases at the same time due to the wrap-around arrangement. Only little friction occurs in the reverse direction—the diameter of the spring increases slightly, but the spring is not unwound. The friction that remains in a freewheel operation is frequently used as an overload clutch (c.f., Wikipedia).

The published German Patent Application No. DE 10 2007 047 394 A1, for instance, discloses a torsional vibration damper comprising at least two parts that are rotatable relative to one another against the effect of a damping device with energy storage elements effective in a circumferential direction, with one part connectible to a drive motor and the other to a shaft to be driven, wherein a torque limiter in serial arrangement with the damping device is additionally provided between the two parts, said torque limiter effective in at least one of the directions of relative rotation possible between the two parts and comprising at least one wrap spring clutch that acts as a freewheel when a pre-defined angle of rotation between the two parts is reached and comprises at least one wrap spring element. This solution is characterized in that at least one end of the wrap spring element is connected to a ring element so as to be fixed against relative rotation, the ring element having support regions for the energy storage elements effective in a circumferential direction and/or the ring element having actuation regions for the freewheel effect.

DESCRIPTION OF THE INVENTION

An object of the present invention is to develop a component group with a friction device including at least two components that are rotatable relative to one another, in particular for use in a transmission and/or an actuator, wherein the amount of friction and thus the degree of efficiency between the components that are rotatable relative to one another is changeable, when the component group is used in an actuator for operating a clutch for instance to prevent an unintentional closing of the clutch upon a failure of the drive of the actuator or to reduce or eliminate the holding current without significantly reducing the degree of efficiency of a spindle drive (against the load) for instance when an actuator with a PWG is used.

The component group with a frictional device includes at least two components that are rotatable relative to one another and, in particular when it is used in a transmission and/or in an actuator, is used for instance to operate a clutch in a vehicle, wherein in accordance with the invention, a coil spring is disposed between the components that are rotatable relative to one another, the coil spring influencing the degree of efficiency/the friction upon a relative rotation of the components. As a function of the direction of rotation, this frictional device of a coil spring type, which, at least in sections, forms a wrap spring, may only slightly increase friction between the components when the actuator is driving against a load and may significantly increase friction between the components when the load is driving in order to lock spindle drives that are optimized in terms of their degree of efficiency/that are non-self-locking in the case of a malfunction (power failure).

Another advantage is that a holding current may be reduced or made unnecessary by the friction element.

The coil spring, which is at least regionally embodied as a wrap spring, is preferably embodied as a single wrap spring or as a double wrap spring or as a torsion wrap spring and is in effective connection with a first component and with a second component that is disposed to be rotatable or rotatable and axially movable relative to the first component.

The first component may be disposed radially inside the second component and the coil spring in the form of a wrap spring or double wrap spring or torsion wrap spring may be located between the first component and the second component and may have one end connected to the first component in a way to be fixed against relative rotation or in a frictional way and may have a second end frictionally connected to the second component.

The coil spring in the form of a torsion wrap spring in particular has the following features: a first region acting as a wrap spring (Eytelwein's formula) and including the first end wherein friction or a constant or variable pre-load for generating friction is generatable in the region A, a second region B1 acting as a torsion spring and including the second end, a transition region interconnecting regions A and B1.

The coil spring embodied as a double wrap spring in particular has the following features: a first region A acting as a wrap spring (Eytelwein's formula) and including a blunt first end, wherein friction or a pre-load/interference a1 for generating friction is generatable in the region A relative to the second component in the form of a hub/hollow shaft/bore, a second region B2 acting as a wrap spring and having a blunt second end and a pre-load/interference a2 relative to the second component in the form of a shaft, a transition region C interconnecting regions A and B2.

When the component group including a friction device is used in an actuator, the actuator includes a transmission that is actuatable by a drive and preferably converts a rotary movement into an axial movement, for instance a PWG or a transmission of different construction, in such a way that a direction-of-rotation-dependent friction between the first component and the second component is slightly increased when an actuator is driving against a load and is significantly increased when the load is driving in order to hold a non-self-locking transmission (e.g., a planetary roller spindle drive is a PWG) in the case of a malfunction/failure of the drive or to reduce or avoid a holding current.

The coil spring in the form of a wrap spring or double wrap spring or the torsion wrap spring is arranged between a rotary element of a planetary roller spindle drive or of another transmission and an actuator part that is fixed to a housing or between two elements disposed to rotate at different rotary speeds relative to one another in a PWG or other transmission.

The wrap spring or double wrap spring or torsion wrap spring may for instance be disposed between a spindle (i.e., first component) that is part of the PWG and is drivable to rotate by the drive and a component (i.e., second component) that is fixed to a frame/housing (spring pot); or between a spindle (i.e., first component) that is drivable to rotate by the drive and is part of the PWG, and a spring pot (i.e., second component) that fixed to a PWG housing against relative rotation; or inside the PWG housing between two components that are rotatable relative to one another.

For instance, a friction device embodied as a coil spring may also be disposed between an outer diameter of a ring gear (i.e., the first component) meshing with the planets of the PWG and an inner diameter of a sleeve (i.e., the second component/hub) surrounding the PWG in the region of the ring gear.

The regions of the wrap spring/double wrap spring/torsion wrap spring are preferably wound out of a tape and are thus connected to one another in the transition region C. In the transition region C, the tape may be twisted so that in region A, the cross-section of the tape has a first orientation and in region B1/B2, the cross-section has an orientation that is twisted relative thereto.

BRIEF DESCRIPTION OF THE DRAWINGS

The invention will be explained in more detail below based on exemplary embodiments and associated drawings.

FIG. 9 is a longitudinal sectional view of an actuator including a PWG and a coil spring embodied as a torsion wrap spring disposed between the threaded spindle and the spring pot fixed against relative rotation to the bearing carrier housing of the spindle bearing, in accordance with an embodiment of the present invention;

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices and materials are now described.

Figure 2:
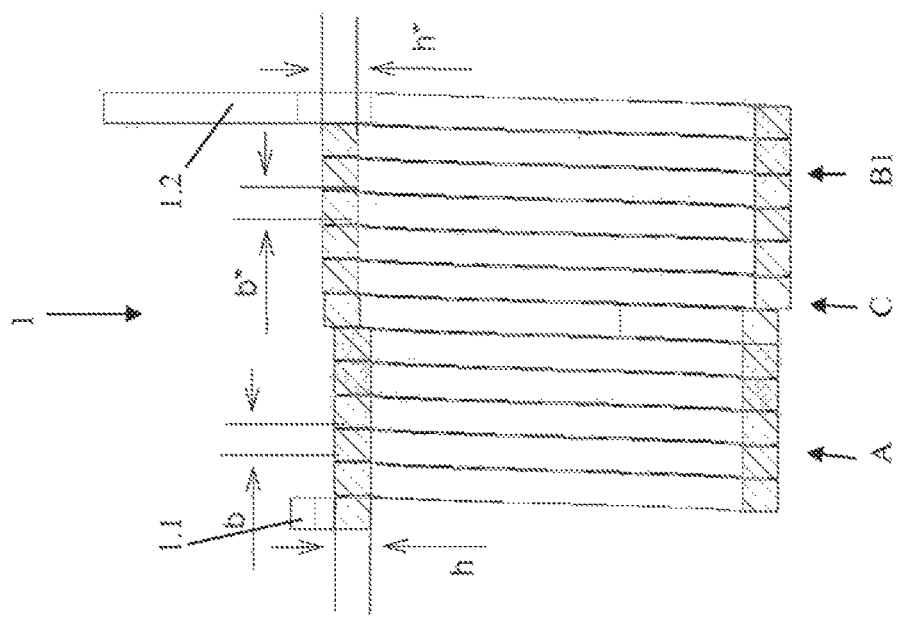
FIG. 2 is a longitudinal sectional view of the coil spring in FIG. 1, in accordance with an embodiment of the present invention.
Figure 1:
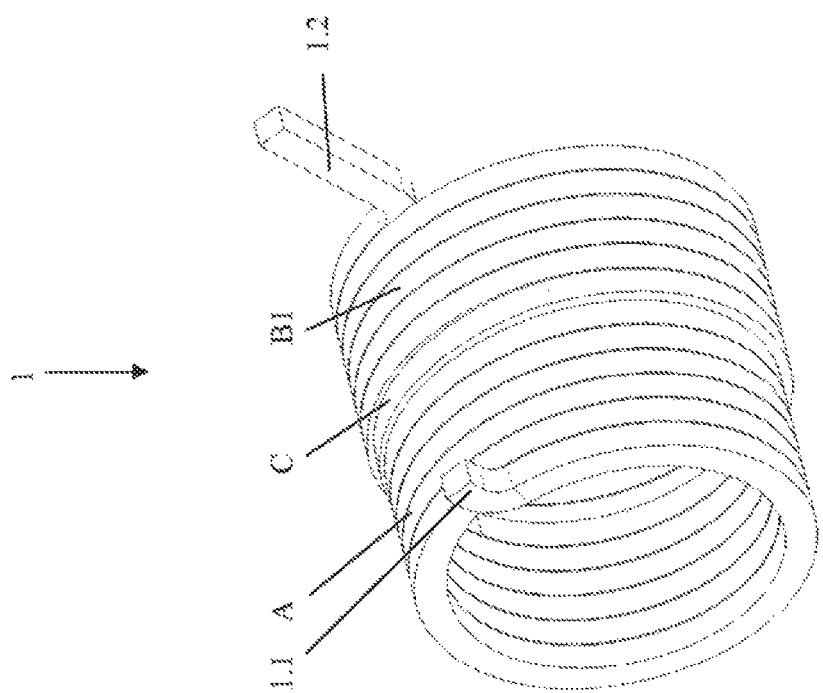
FIG. 1 is a perspective view of a coil spring embodied as a wrap spring in a first region A and as a torsion spring in a second region B, in accordance with an embodiment of the present invention.

In accordance with FIGS. 1 and 2, a first region A acting as a wrap spring (Eytelwein's formula) has first end 1.1, which is bent in a radially outward direction, creating constant friction on end 1.1 or a constant or variable pre-load over first region A relative to a hub (an outer diameter) to create friction. Furthermore, second region B1 acting as a torsion spring has second end 1.2, which is likewise bent in a radially outward direction. Transition region C interconnects regions A and B. In regions B1 and C, the outer diameter and the inner diameter of the coils are greater than in region A.

In all regions, width b and height H of the cross-section of the coils are the same.

Figure 4:
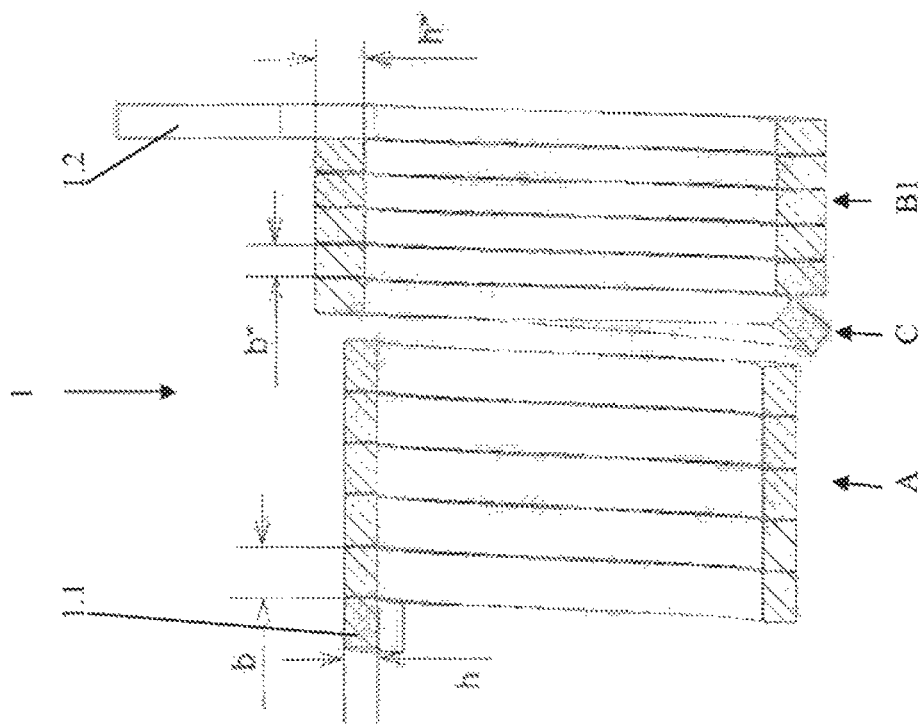
FIG. 4 is a longitudinal sectional view of the coil spring in FIG. 3, in accordance with an embodiment of the present invention.
Figure 3:
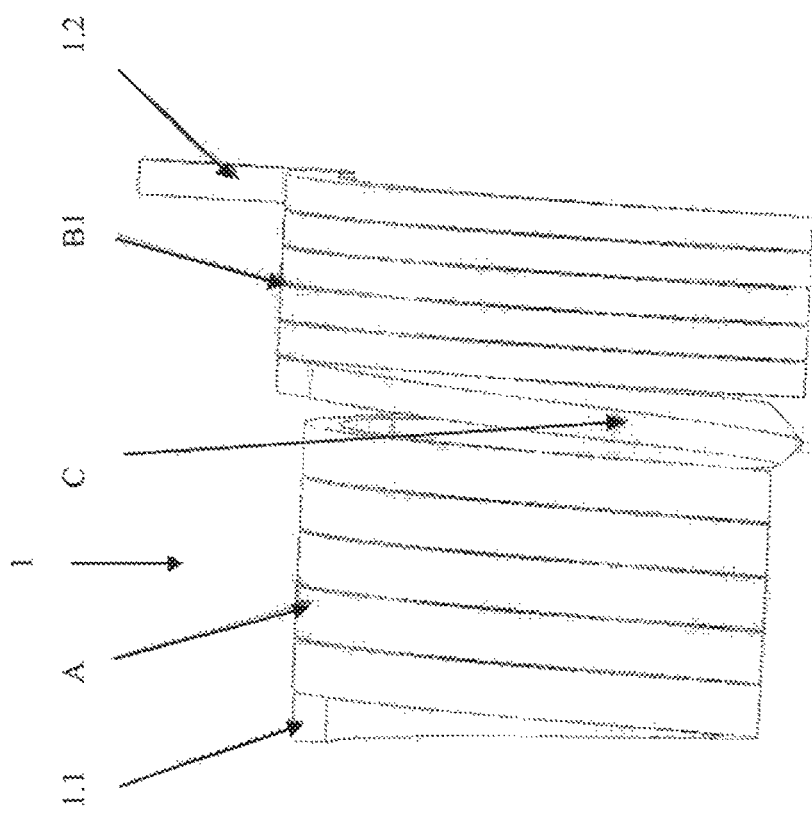
FIG. 3 is a sectional view of a coil spring embodied as a wrap spring in region A and as a torsion spring in Region B and having a rotated/twisted cross-section in a region C, in accordance with an embodiment of the present invention.

In accordance with FIGS. 3 and 4 (three-dimensional view and longitudinal sectional view, respectively), torsion wrap spring 1 likewise has regions A, B1, C, but region C is twisted through 90°. Thus in first region A, the rectangular cross-section of the coils has height h and width b. As a result of the twisting through 90° in region C, in second region B1, which acts as a torsion spring, the rectangular cross section has height h* in B that corresponds to width b in A and width b* in B1 that corresponds to height h in region A. This allows the effect of the entire component to be enhanced while the cross-section of the coils remains the same. End 1.1 of first region A is furthermore designed to be blunt.

FIGS. 5 to 9 indicate how spindle 2 of a PWG, for instance, is combined with coil spring 1 embodied as a torsion wrap spring in accordance with FIGS. 1 and 2.

Figure 6:
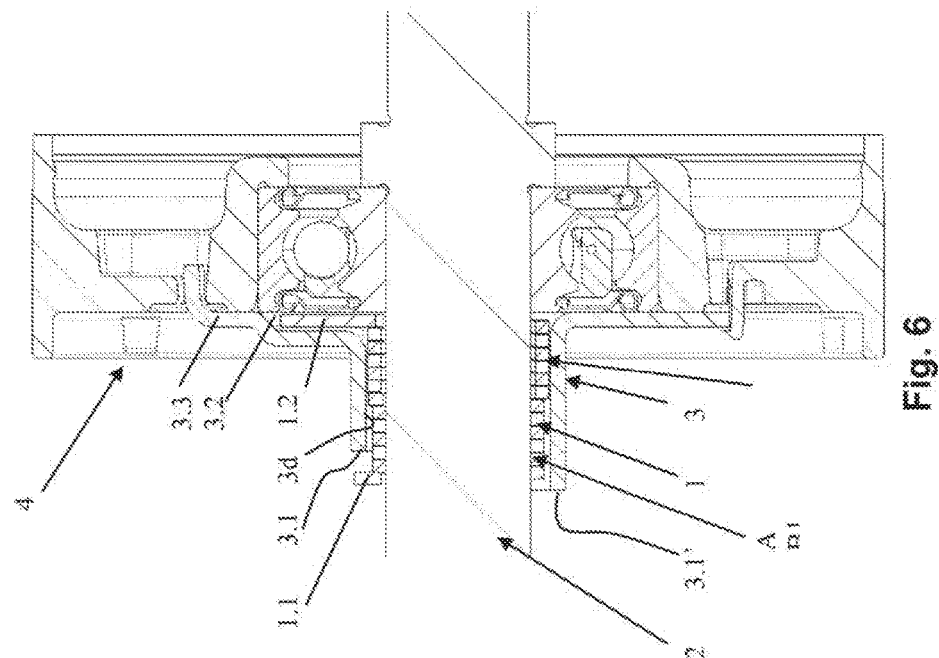
FIG. 6 is a longitudinal sectional view of the housing of FIG. 5, in accordance with an embodiment of the present invention.
Figure 5:
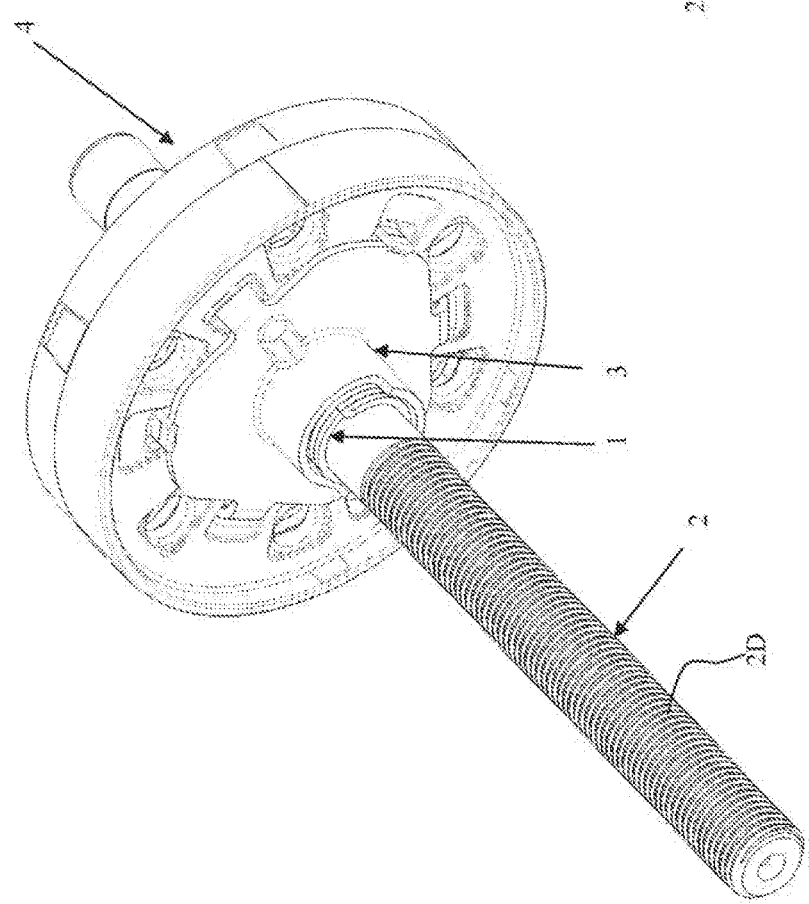
FIG. 5 is a perspective view of a threaded spindle supported in a housing, in accordance with an embodiment of the present invention.

FIG. 5 is a three-dimensional representation of threaded spindle/spindle 2 of a PWG supported in housing 4 to which spring pot 3 is fixed; FIG. 6 is a longitudinal sectional view of the region of housing 4 in accordance with FIG. 5. Coil spring 1, which here is embodied as a torsion wrap spring in accordance with FIGS. 1 and 2, is located between outer diameter 2D of threaded spindle/spindle 2 and inner diameter 3d of spring pot 3, and first end 1.1 of coil spring 1 interacts with end face 3.1 of spring pot 3, said end face 3.1 directed toward end 1.1 and slightly set back relative to left-hand end face 3.1', whereas second end 1.2 of coil spring 1 is fixed against relative rotation in recess 3.2 of spring pot flange 3.3 pointing in a radially outward direction.

Figure 8:
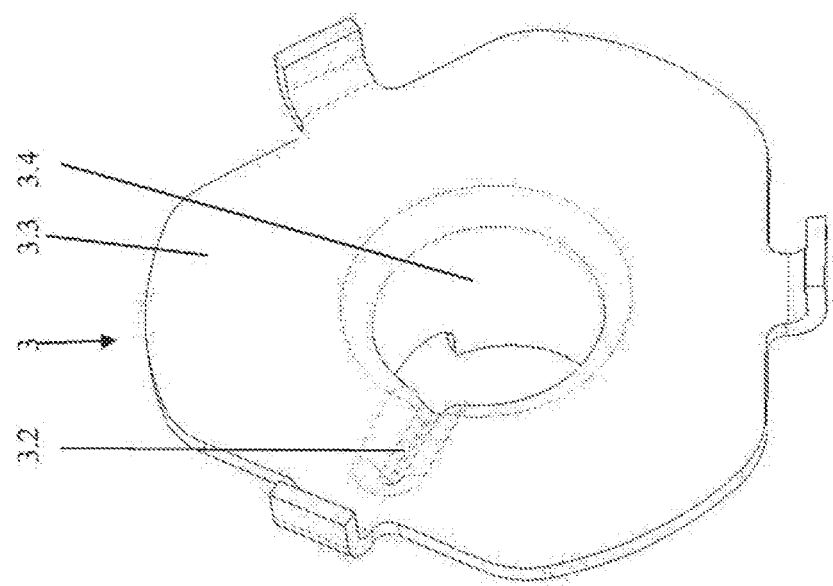
FIG. 8 is a perspective view of a spring pot from the direction of the flange, in accordance with an embodiment of the present invention.
Figure 7:
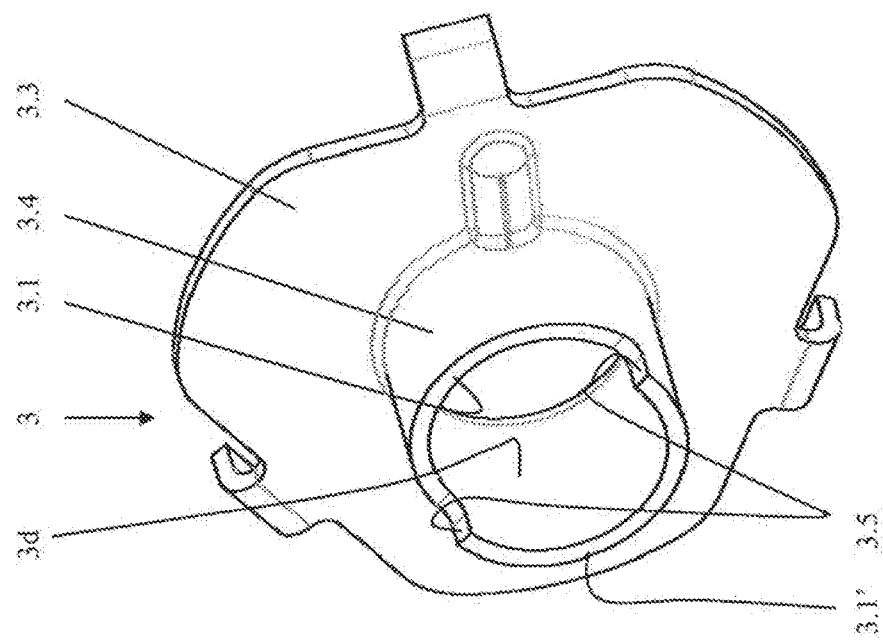
FIG. 7 is a perspective view of a spring pot fixed to the frame from the direction of the end face, in accordance with an embodiment of the present invention.

In FIG. 7, a three-dimensional representation of spring pot 3 of FIGS. 5 and 6 is shown from the direction of end face 3.1, and in FIG. 8, spring pot 3 is shown from the direction of flange 3.3. It is apparent that the inner diameter 3d is formed on a bushing-like region 3.4. End face 3.1, which is set back compared to end face 3.1' and interacts with end 1.1 (not illustrated in FIG. 7) of the coil spring that forms the wrap spring—first region, is also located thereon. Set-back end face 3.1 creates two stops 3.5 for first end 1.1 angled radially outward on wrap spring/first region A (see FIGS. 1 and 2), the two stops 3.5 circumferentially spaced apart from one another.

Recess 3.2 is formed in flange 3.3 in a bead-like way. In the assembled condition, second end 1.2 of torsion spring/second region B1 is inserted into recess 3.2 so as to be fixed against relative rotation.

An actuator using a coil spring 1 in accordance with FIGS. 1 and 2 and the coil spring 1 arrangement shown in FIGS. 5 and 6, respectively, is shown in FIG. 9.

A spindle drive optimized in terms of its degree of efficiency, here in the form of PWG 6, is used. It includes threaded spindle 4 driven by electric motor 7 that essentially consists of stator 7.1 and a rotor 7.2 driving spindle 4.

Here, coil spring 1, which is embodied as a torsion wrap spring, is fixed between the outer diameter of threaded spindle/spindle 2 and the inner diameter of spring pot 3, which is connected to housing 5 of spindle bearing L so as to be fixed against relative rotation. A first region A, which is embodied as a wrap spring, is directed towards PWG 6 and second region B1, which is embodied as a torsion spring, is directed towards electric motor 7. Coil spring 1 is disposed to be axially fixed.

Figure 10:
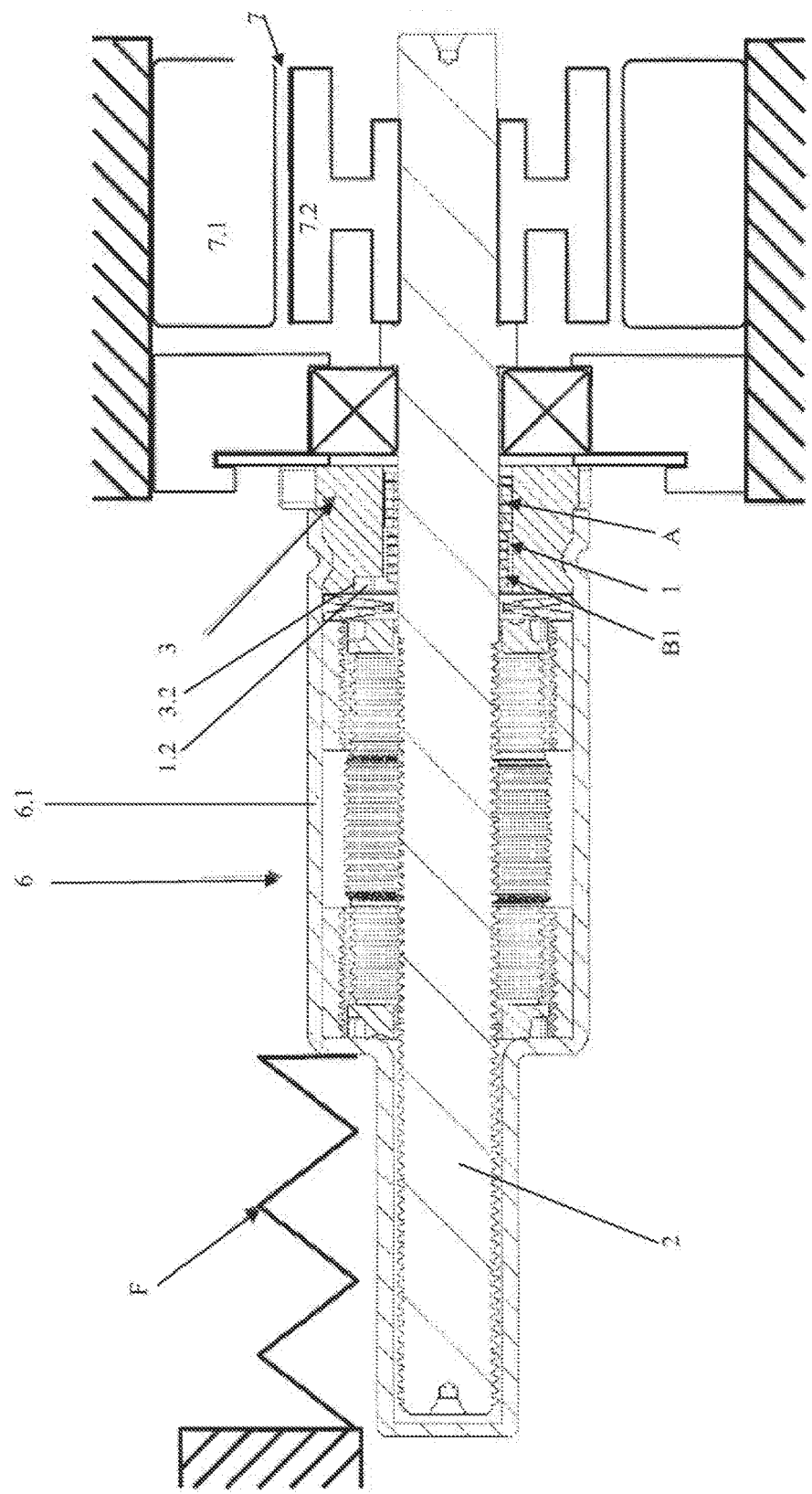
FIG. 10 is a longitudinal sectional view of an actuator including a PWG and a coil spring embodied as a torsion wrap spring disposed between the threaded spindle and the spring pot fixed against relative rotation to the PWG housing, in accordance with an embodiment of the present invention.

A similar design of an actuator including a PWG is shown in FIG. 10; in contrast to FIG. 9, coil spring 1 in the form of a torsion wrap spring is disposed between spindle 2 and spring pot 3, which is part of the PWG and is mounted to PWG housing 6.1 so as to be fixed against relative rotation. Second region B1, which is embodied as a torsion spring, is directed towards PWG 6, and first region A, which is embodied as a wrap spring, is directed towards housing 5. Due to this arrangement, coil spring 1 and spring pot 3 are moved in an axial direction together with PWG housing 6.1. Second end 1.2 is likewise inserted into a recess 3.2 on spring pot 3 so as to be fixed against relative rotation.

When the actuator shown in FIGS. 9 and 10 is operated against axial load F, first region A, acting as a wrap spring, of coil spring 1 is actuated in an opening direction—the frictional torque between the wrap spring (first region A) and spindle 2 is reduced.

When the actuator is driven by axial load F (in the opposite direction of rotation), the wrap spring in the form of first region A is entrained by friction (on first end 1.1 towards end face 3.1 of spring pot 3 in accordance with FIG. 6 and in first region A between the outer diameter of spindle 2 and inner diameter of the wrap spring, respectively) and torsion is applied to second region B1 embodied as a torsion spring. The diameter change relative to the unloaded condition must be provided until there is a balance of moments between the set-back moment (due to the load) and the torsional moment of coil spring 1 in second region B1, and is held in this position. To relieve the load on the actuator/to rotate it further, electric motor 7 needs to be supplied with power. In this process, first end 1.1 is rotated against stop 3.5 (see FIG. 7) in the component that is fixed against relative rotation (spring pot 3). This limits the frictional torque of the wrap spring in first region A; the frictional torque is below the motor torque of electric motor 7, allowing PWG 6 to be adjusted against the wrap spring friction by means of electric motor 7 (active opening).

The arrangement may be reversed in that end of the spring is connected to a rotating part (spindle) and friction occurs relative to a component that is fixed against relative rotation (spring pot).

This alternative in accordance with the invention provides a friction device between a rotating first component (here, spindle 2 is the shaft) and a fixed second component (here, spring pot 3 is the hub) by means of modified coil spring 1, which, as a function of the direction of rotation, reduces friction between the components when the actuator is driving against a load and increases friction between the components when the load is driving, to hold transmissions that are optimized in terms of their degree of efficiency/are not self-locking in the case of malfunction (power failure).

In accordance with the invention, for the first time, the friction and thus the degree of efficiency in a component group, for instance a PWG, can be specifically influenced due to the provision of a coil spring at least sections of which are embodied as a wrap spring. In the case of a driving load return of the PWG under load, i.e. without rotation of the rotor, the spindle does not rotate. The wrap spring is clamped between the spring pot that is fixed against rotation and the PWG. The wrap spring is positively connected to the one side frictionally connected to the other side. The friction causes the spring to contract, resulting in a self-locking effect for the component group. For a case in which the defect is eliminated and the electric motor is actively supplied with power, respectively, the wrap spring end is placed against a corresponding stop and consequently the frictional torque is limited. As a result, the self-locking effect is overcome.

In addition to being used in combination with a PWG, an application in combination with another transmission such as a ball spindle drive (KGT) is possible.

FIGS. 11-30 illustrate the use of coil spring 1 in the form of a double wrap spring or a torsion wrap spring integrated in a transmission embodied as a PWG.

Figure 12:
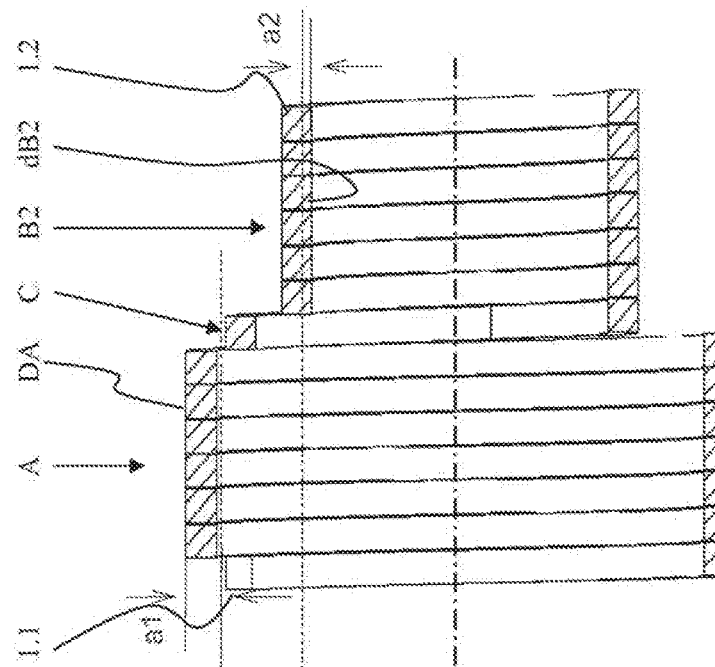
FIG. 12 is a longitudinal sectional view of the free double wrap spring in FIG. 11 indicating a pre-load/allowance a1 relative to the inner diameter of the hub and a pre-load/allowance a2 relative to the outer diameter of the shaft, in accordance with an embodiment of the present invention.
Figure 11:
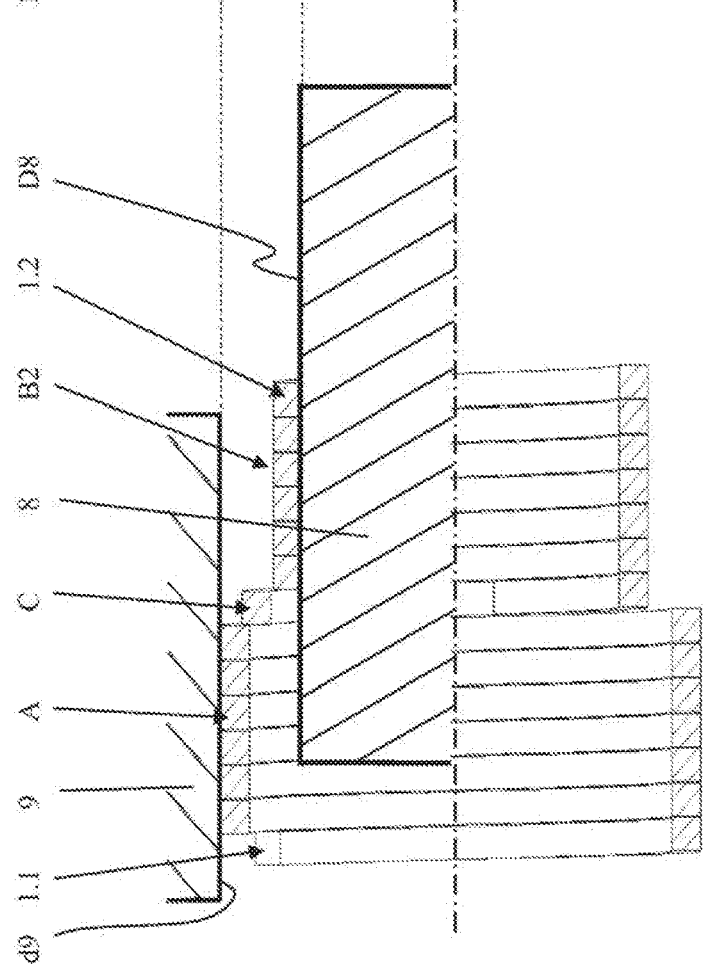
FIG. 11 is a principal view of an alternative of a double wrap spring in relation to a diagrammatically arranged shaft and hub (assembled), in accordance with an embodiment of the present invention.

FIG. 11 is a schematic diagram of an alternative of coil spring 1 in the form of a double wrap spring relative to diagrammatically indicated shaft 8 (first component) and hub 9 (second component) in an assembled condition. FIG. 12 is a longitudinal sectional view of the free double wrap spring in accordance with FIG. 11. As shown in FIGS. 11 and 12, coil spring 1 has first region A with blunt end 1.1. First region A acts as a wrap spring and has outer diameter DA that has a pre-load or allowance a1 (shown in FIG. 12, also referred to as an interference) relative to inner diameter d9 of hub 9. Second region B2 of coil spring 1 is likewise embodied as a wrap spring, but as a wrap spring of smaller diameter, and likewise has blunt second end 1.2. Pre-load/allowance a2 exists between outer diameter D8 of shaft 8 and inner diameter dB2 of second region B2. Transition region C extends between first region A and second region B2.

Figure 13:
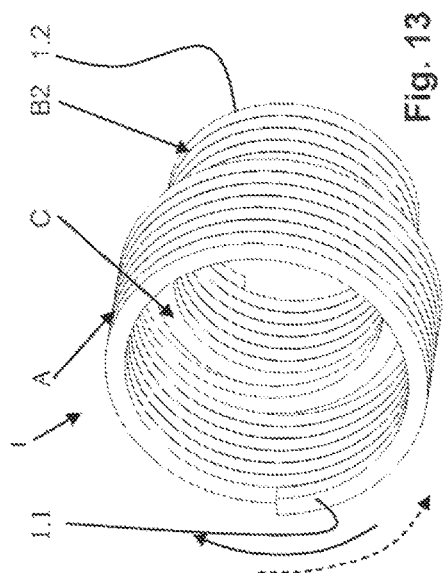
FIG. 13 is a perspective view of a double wrap spring with two blunt ends and a twisted region C, in accordance with an embodiment of the present invention.
Figure 14:
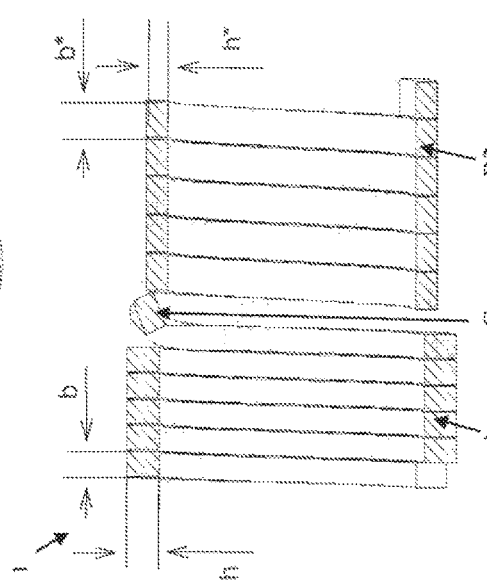
FIG. 14 is a longitudinal sectional view of the double wrap spring of FIG. 13, in accordance with an embodiment of the present invention.

FIG. 13 is a three-dimensional representation and FIG. 14 is a longitudinal sectional view of wrap spring 1 in the form of a double wrap spring with two blunt ends 1.1, 1.2, first region A acting as a wrap spring, second region B2 acting as a wrap spring and having smaller outer and inner diameters than first region A. As it is the case with the torsion wrap spring shown in FIGS. 3 and 4, transition region C is twisted/angled through 90°. Consequently, after the twisting in region C through 90°, the rectangular cross-section of the windings has height h and a width b in first region A and in second region B2, which acts as a wrap spring, height h* corresponding to width b in region A and width b* corresponding to height h in region A.

Figure 15:
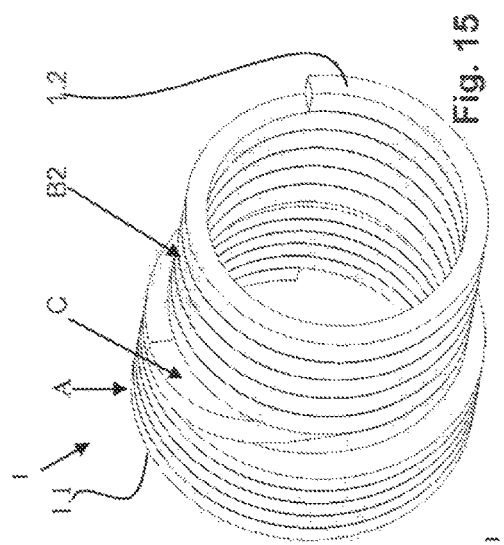
FIG. 15 is a perspective view of a double wrap spring with two blunt ends and an untwisted region C, in accordance with an embodiment of the present invention.
Figure 16:
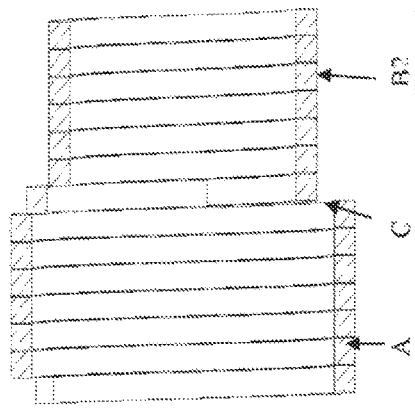
FIG. 16 is a longitudinal sectional view of the double wrap spring of FIG. 15, in accordance with an embodiment of the present invention.

A coil spring 1, likewise embodied as a double wrap spring, but without twisted transition region C between first wrap spring region A and second wrap spring region B2, is shown in FIGS. 15 and 16. First and second ends 1.1, 1.2 are likewise blunt ends, and the outer and inner diameters of second region B2 are smaller than the outer and inner diameters of first region A.

Figure 17:
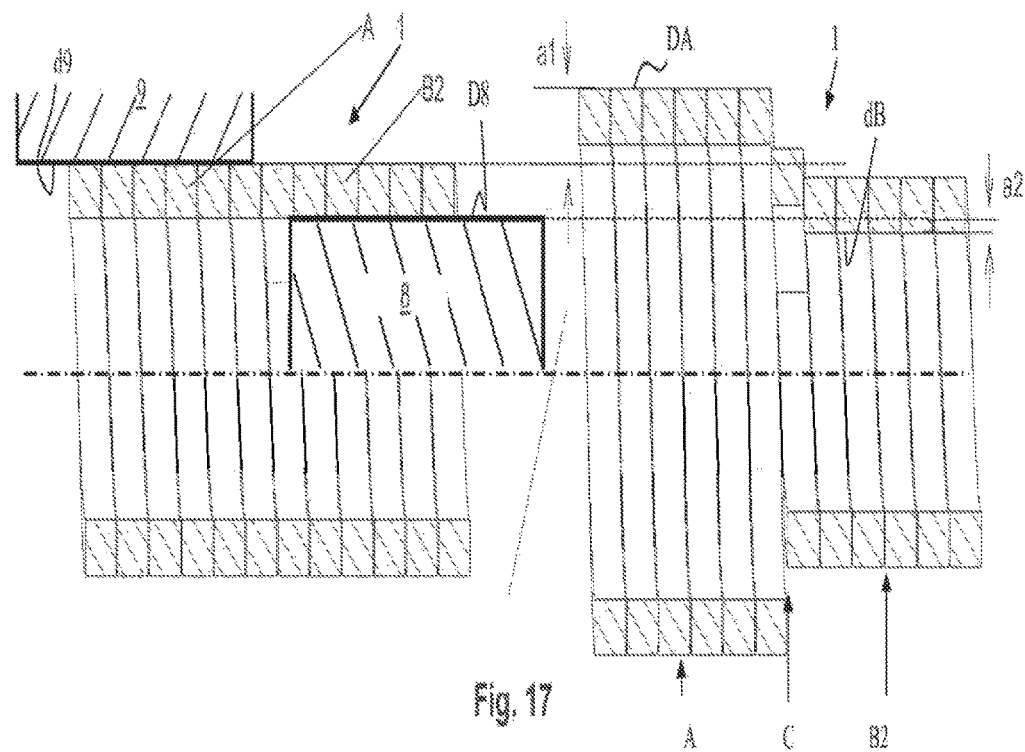
FIG. 17 is cross-sectional view of an alternative to the design of the allowance of a double wrap spring with two blunt ends, in accordance with an embodiment of the present invention.

FIG. 17 illustrates a first alternative of the design of the allowance of coil spring 1 embodied as a double wrap spring with two blunt ends, assembled on the left-hand side and free on the right-hand side. In the non-assembled, free condition, first region A has a greater diameter than second region B2 (regions A and B2 act as wrap springs) so that in the assembled condition (illustration on the left) they have an essentially identical diameter.

Figure 18:
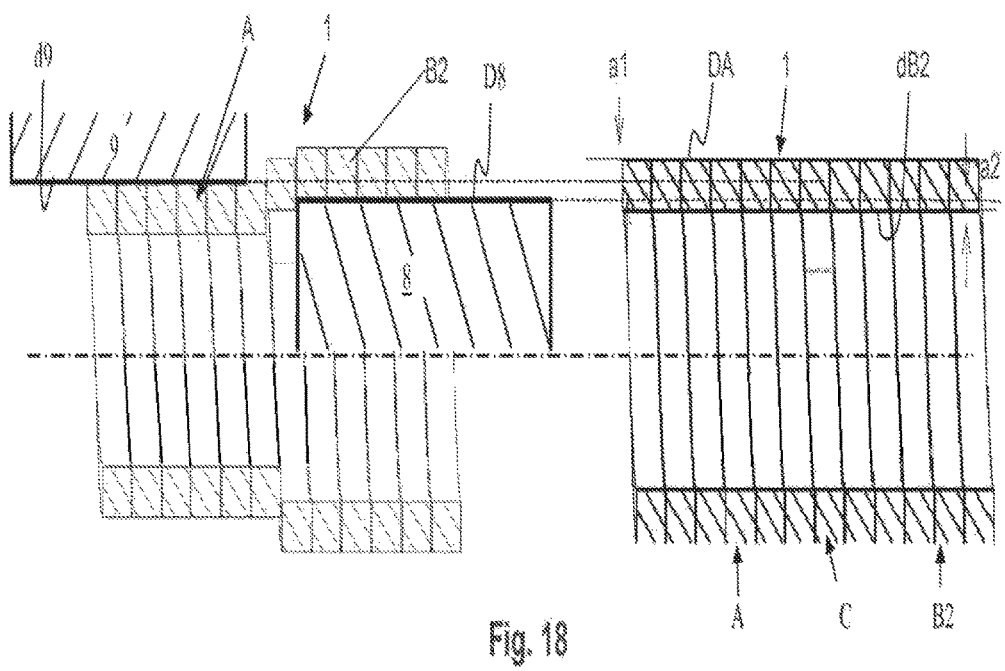
FIG. 18 is a cross-sectional view of yet another alternative to the design of the allowance of the double wrap spring with two blunt ends, in accordance with an embodiment of the present invention.

In accordance with a second alternative shown in FIG. 18, the coil spring, embodied as a double wrap spring, has an essentially uniform outer and inner diameter in the original condition; in the assembled condition, the outer diameter of first region A becomes smaller than the outer diameter of second region B2.

In both alternatives, shaft 8 has outer diameter D8 and second region B1 has inner diameter dB, resulting in allowance a2 (interference) between these two. Between inner diameter d9 of hub 9 and the outer diameter of first region A, there is allowance/interference a1. Since the original shapes of coil springs 1 in the unassembled condition vary, their assembled conditions in connection with the allowances relative to the shaft and hub vary in FIGS. 17 and 18.

The alternative shown in FIG. 18 is advantageous in terms of the manufacturing of the coil spring 1 (constant winding diameter). In the alternatives shown in FIG. 18, shaft 8 and hub 9 must not overlap in an axial direction in the region of the double wrap spring. However, compared to the alternative shown in FIG. 17, they may be advantageous in terms of the radial installation space.

Figure 19:
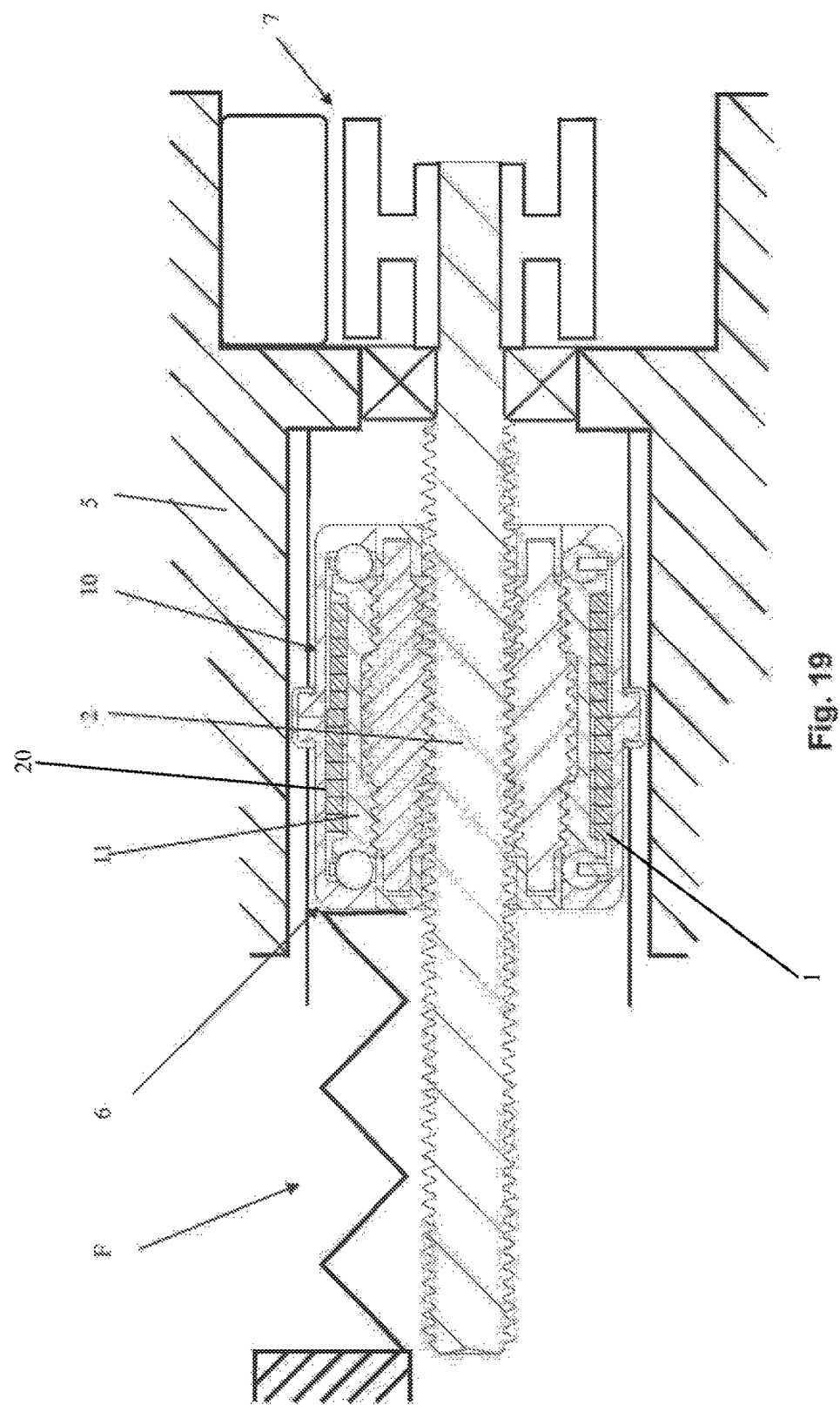
FIG. 19 is a longitudinal sectional view of an actuator with a double wrap spring integrated into the PWG housing, which is fixed to the bearing carrier housing so as to be fixed against relative rotation, in accordance with an embodiment of the present invention.

FIG. 19 is a longitudinal sectional view of an actuator with cage 10 in which the double wrap spring (coil spring 1) is integrated and which is fixed against relative rotation on the bearing carrier housing/housing 5 of a spindle drive, in this case PWG 6, that is optimized in terms of the degree of efficiency thereof. Coil spring 1, embodied as a double wrap spring, is freely disposed between the inner diameter of cage 10 (i.e., the hub) and the outer diameter of ring gear 11 (i.e., the shaft) of PWG 6. The inner diameter of the cage 10 forms a circular seat 20 for the spring 1.

In summary, the coil spring designed in accordance with FIGS. 11-19 in particular has the following features: first region A acting as a wrap spring (Eytelwein's formula) and having blunt first end 1.1 at an essentially constant pre-load/interference a1 relative to hub 9 (hollow shaft/bore); second region B2 acting as a second wrap spring (Eytelwein's formula) and having blunt end 1.2 at an essentially constant pre-load/interference a2 relative to a shaft 8; both regions A and B2 are wound from one tape and are thus connected in transition region C; in region C, the tape may be twisted through 90° to enhance the difference effect between first region A and second region B2; both ends 1.1, 1.2 are freely disposed on shaft 8 or in hub 9, a rotary assignment during assembly is not necessary; it is mandatory for one spring region to be mounted to a shaft and for the other spring region to be mounted to a hub.

The double wrap spring thus prevents a relative movement between two components (hub/shaft) that are free in rotary terms. This is necessary in particular in actuators that are driven by an axial force but do not have a self-locking function yet need to hold their position in the case of a malfunction (power failure).

Decisive aspects in terms of the function are the preferably different drag torques (i.e., friction) in first region A and second region B, which are calculated in accordance with the following equation:

$$M_{schlepp} = 2\,a\,I\,E/\,d^2;$$

wherein a is
interference/allowance (overlap between coil spring and shaft),
I is area moment of inertia,
E is modulus of elasticity, and
d is average winding diameter in assembled/tensioned condition, and are thus, in particular, independent of the coefficient of friction. In addition, the locking torque of the one spring needs to be capable of at least supporting the drag torque of the respective other spring to attain the dimensioned drag torques (on the respective spring region operated in a releasing way).

The functioning is as follows: When hub 9 is rotated relative to shaft 8 (driven by a drive motor, preferably electric motor 7) against the winding direction of coil spring 1, first region A of the double wrap spring is pressed radially into hub 9 and locked; at the same time, second region B2 is dragged on shaft 8. If second region B2 has the lower drag torque, this is the preferred direction of rotation to operate against axial load F (for instance to open a clutch).

When hub 9 is rotated relative to shaft 8 (driven by the axial load with non-rotating spindle 2, c.f., FIG. 19) in the winding direction, second region B2 is locked on shaft 8 and supports the torque and first region A of the double wrap spring is operated in an opening way but may support a drag torque that is greater than the return torque of the axial force. In accordance with the invention, any reset in particular in the case of a malfunction is avoided. To actively reset the actuator, the drive motor needs to operate against the drag torque of spring region A (with the aid of the return torque of the axial load).

The coil spring acting as a double wrap spring thus for the first time acts as a safety element against an undesired opening of the clutch in the case of a malfunction because it is used as a friction element. Depending on the direction of rotation, a sufficient frictional torque is provided in the closing direction and a very low frictional torque is provided in the opening direction.

This makes use of the fact that in the opening direction, a wrap spring clutch generates constant frictional torque M, independently of the number of windings and of the coefficient of friction.

Thus using a coil spring, a self-locking effect of a planetary roller gearing (PWG) is attained. Due to the construction as a double wrap spring with two different pre-loads, a rotation in one direction brakes to a lesser extent than in the other direction. In the free condition, the wrap spring may be extended to different degrees and may then form a common outer surface in the tensioned condition or vice versa.

Figure 20:
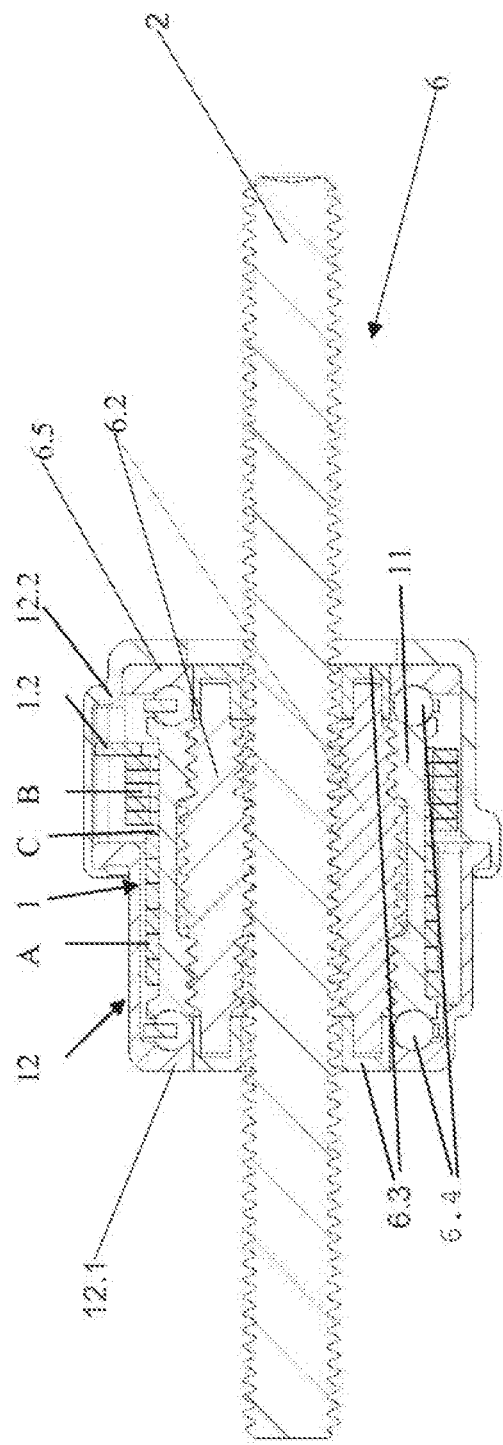
FIG. 20 is a longitudinal sectional view of an actuator in which the wrap spring includes two regions and is disposed between the outer diameter of the ring gear and the inner diameter of a two-part sleeve that has an end embodied as a torsion spring and connected to the planetary carrier in a way to fix the sleeve against relative rotation, wherein the sleeve has different inner diameter regions and the wrap spring has end-side stops relative to the sleeve, in accordance with an embodiment of the present invention.

FIG. 20 illustrates a further embodiment in a longitudinal sectional view of an actuator in which coil spring 1 with two regions (first region A embodied as a wrap spring and second region B1 embodied as a torsion spring) is disposed between the outer diameter of ring gear 11 and the inner diameter of two-part sleeve 12. Sleeve 12 is connected to planet carrier 6.3 receiving planets 6.2 that mesh with spindle 2 and has different inner diameter regions. First region 12.1 has a smaller inner diameter adapted to first region A (wrap spring) and second region 12.2 has a greater inner diameter adapted to second region B1 (torsion spring) of wrap spring 1. Second end 1.2, which is formed on second region B1, is angled in a radially outward direction and coupled to second region 20.2 of sleeve 20 so as to be fixed against relative rotation.

Ring gear 11 is axially located between two axial bearings 6.4 and is fixed via axial bearing ring 6.5.

Ring gear 11 with its outer diameter forms the shaft. First component and the inner diameter of sleeve 12 forms the hub. Second component, with coil spring 1 forming a friction device disposed therebetween.

Figure 21:
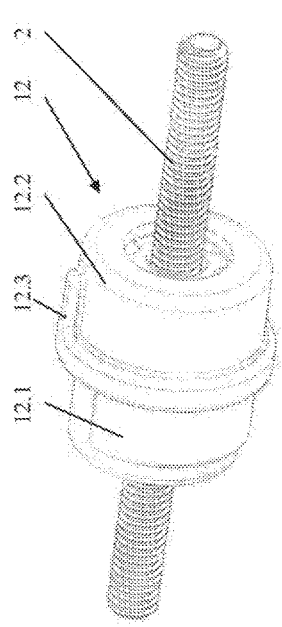
FIG. 21 is a perspective view of the actuator in FIG. 20, in accordance with an embodiment of the present invention.

FIG. 21 is a three-dimensional representation according to FIG. 20 illustrating two-part sleeve 12 and spindle 2. Regions 12.1, 12.2 are connected to one another in a housing-like way, and region 12.2 has a recess 12.3 that extends in a radially outward direction and into which the torsion-spring-side second end 1.2 of the coil spring is inserted so as to be fixed against relative rotation.

Figure 22:
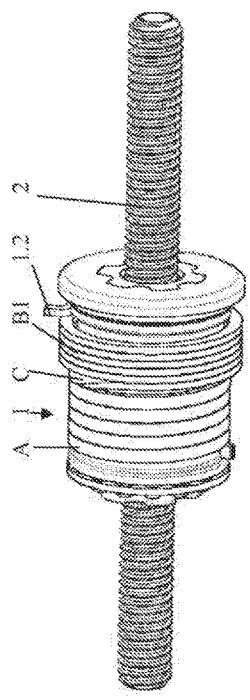
FIG. 22 is a perspective view of the actuator of FIG. 21 without a sleeve, in accordance with an embodiment of the present invention.
Figure 23:
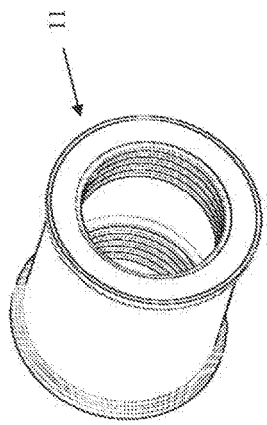
FIG. 23 is a perspective view of a ring gear, in accordance with an embodiment of the present invention.

FIG. 22 is a three-dimensional representation according to FIG. 21 without sleeve 12, illustrating the different diameter regions of coil spring 1 in the form of first region A embodied as a wrap spring and second region B1 embodied as a torsion spring. Second end 1.2 of coil spring 1 engages in recess 12.3 of sleeve 12 so as to be fixed against relative rotation. Spindle 2 runs centrically in the PWG. A three-dimensional illustration of ring gear 11 is shown in FIG. 23. Coil spring 1 (not shown in this Figure) is located on the outer diameter thereof (without reference symbol), the planets (likewise not shown in this Figure) roll on the inner diameter thereof.

Figure 24:
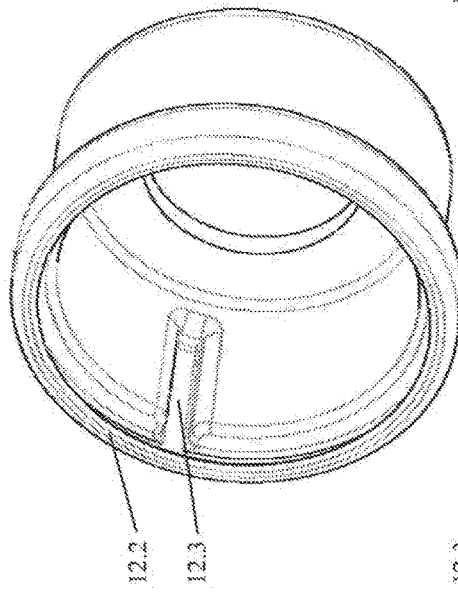
FIG. 24 is a perspective view of a first part of the sleeve, in accordance with an embodiment of the present invention.
Figure 25:
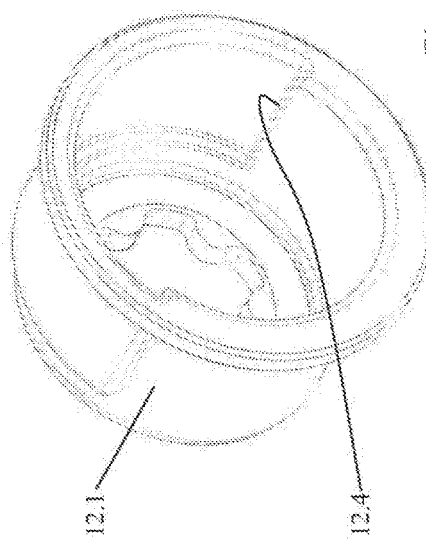
FIG. 25 is a front view of the first part of the sleeve with the wrap spring inserted, in accordance with an embodiment of the present invention.
Figure 27:
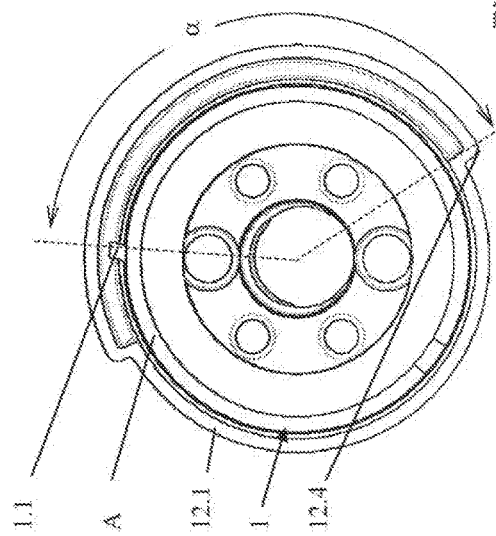
FIG. 27 is a front view of the second part of the sleeve with the wrap spring inserted, in accordance with an embodiment of the present invention.

A three-dimensional representation of first part 12.1 of sleeve 12 is shown in FIG. 24 and a front view of a schematic diagram of the first part of sleeve 12.1 with the wrap spring (first region A) inserted is shown in FIG. 25. In a way similar to spring pot 3 in FIGS. 7 and 8, first part 12.1 of sleeve 12 has stop 12.4 for first end 1.1 angled radially outward on coil spring 1. End 1.1 of the wrap spring and stop 12.4 form a torsion angle a.

Figure 26:
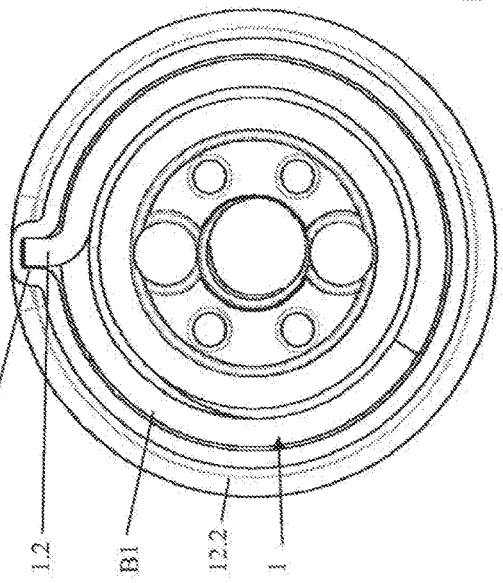
FIG. 26 is a perspective view of a second part of the sleeve, in accordance with an embodiment of the present invention.

FIG. 26 is a three-dimensional illustration of a second part of sleeve 12.2 with recess 12.3 extending in a radially outward direction. Based on a schematic diagram of second part 12.2 of sleeve 12, FIG. 27 indicates that second end 1.1 of second region B1 of coil spring 1, wherein end 1.1 extends in a radially outward direction and second region B1 acts as a torsion spring, is inserted into recess 12.3 so as to be fixed against relative rotation.

It is apparent from FIGS. 20, 22, 25, and 27 that transition region C of the coil spring is twisted through 90° so that the height of the windings of first region A corresponds to the width of the windings in second region B2 and the width of the windings of first region A corresponds to the height of the windings of second region B1.

In this alternative (FIGS. 20-27), the actuator is controlled as a function of the circumferential path and of the angle, respectively, because coil spring 1, in the form of a combined wrap/torsion spring, is disposed between ring gear 11 and planet carrier 6.3 of PWG 6.

As sleeve 12 (or rather two halves 12.1, 12.2 thereof) is connected to planet carrier 6.3 so as to be fixed against relative rotation, sleeve 12 is functionally associated with planet carrier 6.3.

First half 12.1 of sleeve 12 has a stop 12.4 for first end 1.1; in an assembled state, stop 12.4 is spaced apart from said first end 1.1 by an angle a in the closing direction of the wrap spring (first region A).

Second sleeve 12.2 has a recess 12.3 into which second end 1.2 is inserted so as to be fixed against relative rotation.

Ring gear 11 has a cylindrical region on which first region A (wrap spring) of coil spring 1 is mounted under a pre-load/interference.

Second region B1 of the spring (torsion spring region) needs to have sufficient space for torsion in radially inward and radially outward directions from the surrounding components (sleeve 12 and ring gear 11) to be able to carry out its function.

The functioning is as follows: If PWG 6 is operated against a load, force F, the wrap spring region or, first region A of coil spring 1 is operated in an opening direction via friction due to interference between ring gear 11 and first region A. The low drag torque in the opening direction (independent of the coefficient of friction) only has a small influence on the degree of efficiency of PWG 6. If PWG 6 is driven by load F, the wrap spring region (first region A) is entrained (locking direction) by friction due to interference (between ring gear 11 and first region A) and torsion is applied to second region B1 in the form of the torsion spring between ring gear 11 and planet carrier 6.3 until the reset torque (due to the load) and torsion spring torque are balanced. Additional driving, for instance by means of a drive motor, further twists second region B2 (torsion spring region) until first end 1.1 reaches stop 12.4 in first half 12.1 of sleeve 12 and ring gear 11 slips in coil spring 1 (motor driving torque is greater than torsional torque up to stop).

Basically, coil spring 1 may also be inserted onto ring gear 11; in this case, stop 12.4 for first end 1.1 needs to be provided on ring gear 11 or another component that is fixed against rotation relative thereto. The cylindrical region (friction region) then needs to be disposed in sleeve 12, which will be described below based on another alternative.

This solution likewise allows a self-locking effect for PWG 6 using a double spring with two different spring regions. In the alternative that will now be described, the coil spring is embodied as a double wrap spring and is disposed between sleeve 12 and ring gear 11. A rotation of coil spring 1 is exclusively generated by a rotation of ring gear 11. Low friction in the operating direction and increased friction against this direction may be achieved by pre-loads (double wrap spring) or varying mechanisms of action of the double spring (wrap spring and torsion spring). This second friction cannot be attained over the entire path by the reset force of the clutch alone; by means of a motor, this force may be overcome; from a specific angle of rotation on, by the provision of an axial stop for the spring in the first sleeve part a simpler resetting may then be achieved by means of the motor.

Figure 28:
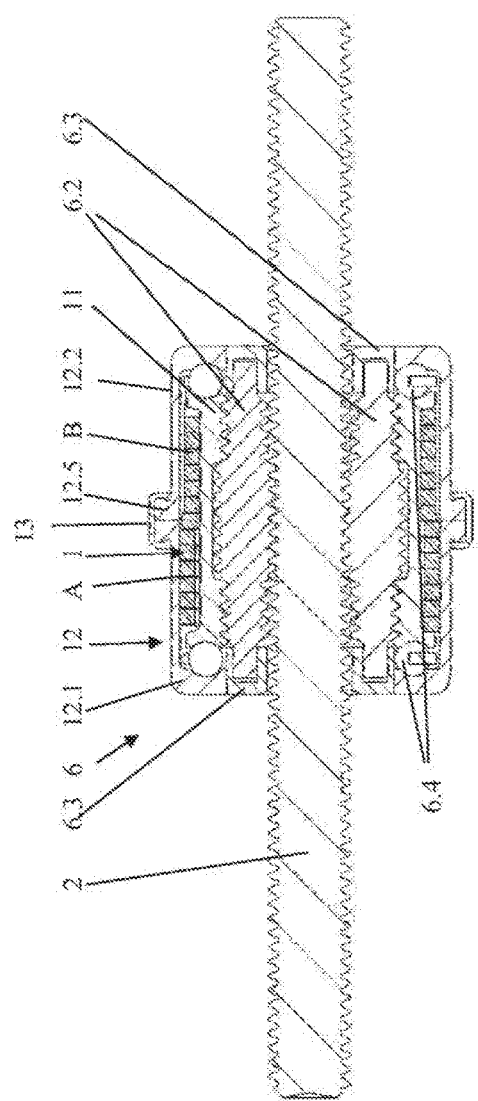
FIG. 28 is longitudinal sectional view of a PWG of similar design as in FIG. 20 but including a wrap spring acting as a double wrap spring and including a two-part sleeve of the same inner diameter, in accordance with an embodiment of the present invention.
Figure 29:
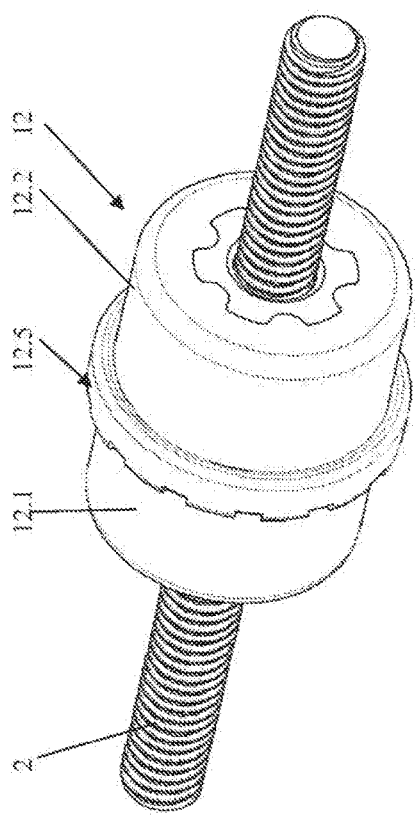
FIG. 29 is a perspective view of the PWG in FIG. 28, in accordance with an embodiment of the present invention.

FIG. 28 is a longitudinal sectional view and FIG. 29 is a three-dimensional representation of PWG 6 similar to the one shown in FIG. 20 but in the form of coil spring 1 acting as a double wrap spring and with two-part sleeve 12 of identical inner diameter.

Coil spring 1 has first region A embodied as a wrap spring and a second region B1 embodied as a wrap spring. First region A is in effective connection with the inner diameter of first part 24.1 of sleeve 24; second region B1 is in effective connection with the outer diameter of ring gear 11. Sleeve 12 is connected to be fixed against relative rotation to planet carriers 6.3 receiving planets 6.2. Planets 6.2 mesh with spindle 2 and ring gear 11 is located between the two axial bearings 6.4.

Similarly, ring gear 11 with its outer diameter forms the shaft. First component and the inner diameter of sleeve 12 forms the hub. Second component with coil spring 1, which forms a friction device, disposed there between.

A three-dimensional representation in accordance with FIG. 28 is apparent from FIG. 29, indicating two-part sleeve 12 and spindle 2. Regions 12.1, 12.2 are likewise connected to one another in a housing-like way; in the connection region, they form collar 12.5 extending in a radially outward direction and surrounded by sheet-metal clamp 13.

Figure 30:
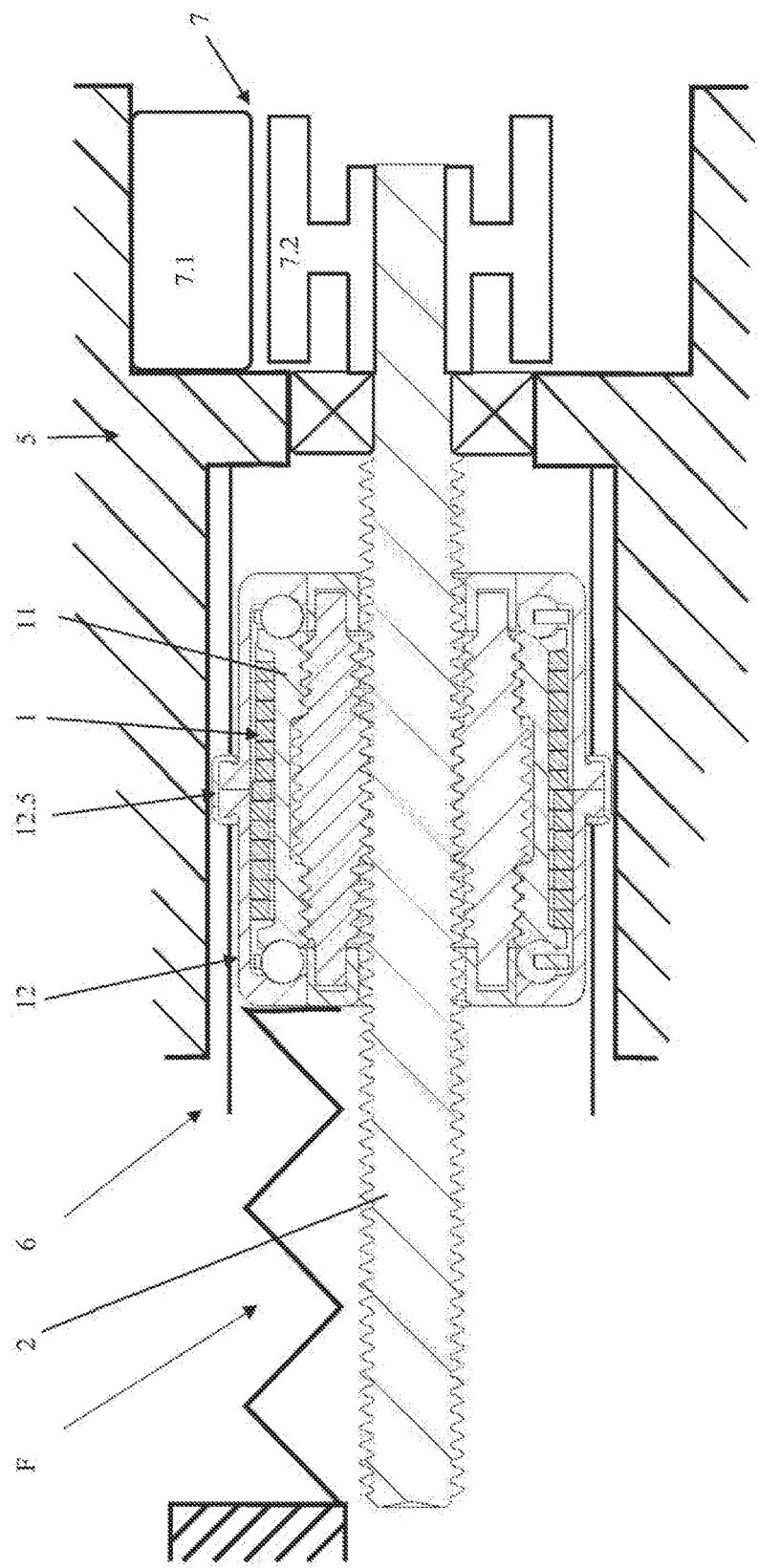
FIG. 30 illustrates a longitudinal sectional view of an actuator including a PWG as in FIGS. 28 and 29, in accordance with an embodiment of the present invention.

FIG. 30 illustrates an actuator with a spindle drive optimized in terms of its degree of efficiency in the form of PWG 6 in accordance with FIGS. 28 and 29 and designed in a way similar to the one shown in FIG. 19, and integrated coil spring 1 in the form of a double wrap spring. Coil spring 1, embodied as a double wrap spring, is freely disposed between the inner diameter of sleeve 12 (i.e., the hub) forming the spring pot and the outer diameter of ring gear 11 (i.e., the shaft) of PWG 6.

In the alternative shown in FIGS. 28-30, the actuator operates in a force/torque-controlled way.

First region A of the coil spring has interference relative to a cylindrical region of ring gear 12 and is frictionally mounted thereon.

A second region B2 of the coil spring has interference relative to a cylindrical region of the sleeve (functionally to be associated with the planet carrier) and is frictionally mounted thereon. An advantage of this alternative is that a rotary assignment of the double wrap spring to the surrounding components is not necessary.

The mechanism of action of the spring fitted into the sleeve and frictionally acting on a cylinder-shaped section of the ring gear may be reversed.

The component group of the invention with a friction device allows the transmission to be held in its position when the drive fails and a holding current to be reduced or avoided. An advantage in this context is the small influence on the degree of efficiency in the one direction of operation (for instance when opening a clutch) and the self-locking effect in the other direction of operation (for instance when closing a clutch).

By means of the transmission, for instance the PWG, which is integrated into an actuator, a clutch is preferably operated by an axial movement of the PWG in which the rotary movement of the spindle is converted into an axial movement. Upon a rotary movement of the spindle, sleeve 12 of the PWG (which, for instance has a shoulder extending in a radially outward direction) carries out an axial movement against the load of the diaphragm spring fingers and actuates the latter.

LIST OF REFERENCE SYMBOLS

1 coil spring
2 first end
2.1 second end
3 spring pot
3.1 end face
3.1' end-side end face
3.2 recess
3.3 flange
3.4 bushing-like region
3.5 stops
3$d$ inner diameter
4 spindle
5 housing
6 PWG
6.1 PWG housing
6.2 planets
6.3 planet carrier
6.4 axial bearing
7 electric motor
7.1 stator
7.2 rotor
8 shaft
9 hub
10 cage
11 ring gear
12 sleeve
12.1 first region of sleeve
12.2 second region of sleeve
12.3 recess
12.4 stop
12.5 collar
A first region
B second region
C transition region
b width of windings in first region A
h height of windings in first region A
b* width of windings in second region B1
h* height of windings in second region B2
$D_8$ outer diameter of shaft 8
$d_9$ inner diameter of hub

What is claimed is:

1. A component group with a friction device integrated in a planetary roller spindle drive (PWG), the component group comprising:

first and second components that are rotatable relative to one another and are integrated in the PWG; and a coil spring disposed between the components such that a first section of the spring is in contact with the first component and a second section of the spring is in contact with the second component, the coil spring being configured to provide a first rotational resistance in response to relative rotation of the components in a first direction and a second, larger rotational resistance in response to relative rotation of the components in a second direction.

2. The component group of claim 1, wherein the coil spring is a double wrap spring.

3. The component group of claim 1, wherein the first component is disposed radially inside the second component and the coil spring is located between the first component and the second component.

4. The component group of claim 1, wherein the coil spring includes a transition section disposed between the first and second sections.

5. The component group of claim 1, wherein the first section and the second section have different diameters.

6. The component group of claim 1, wherein the first component is a hub of the PWG and the second component is a ring of the PWG, wherein the ring is supported for rotation within the hub and the coil spring is radially disposed between the ring and the hub.

7. The component group of claim 6, wherein the first section is seated on an inner surface of the hub and the second section is seated on an outer surface of the ring.

8. The component group of claim 1, wherein the first section exerts a first drag torque on the first component in response to relative rotation in the first direction and exerts a second drag torque on the first component, that is lower than the first drag torque, in response to relative rotation in the second direction.

9. The component group of claim 8, wherein the second section exerts a third drag torque on the second component in response to relative rotation in the first direction and exerts a fourth drag torque on the second component in response to relative rotation in the second direction, wherein the fourth drag torque is larger than the third drag torque.

10. An actuator comprising:
a planetary roller spindle drive (PWG) including a spindle and a ring encircling the spindle and operably coupled to the spindle such that movement of the spindle rotates the ring;

a component defining a circular seat on an inner diameter of the component, wherein the ring is configured to rotate relative to the component; and a double wrap spring including a first section having a first at-rest diameter that is larger than a diameter of the seat and disposed on the seat such that the first section is compressed, and a second section disposed on the ring and having a second at-rest diameter that is smaller than the first diameter.

11. The actuator of claim 10, wherein the double wrap spring further includes a third section axially disposed between the first and second sections, wherein an at-rest diameter of the third section is smaller than the first diameter and larger than the second diameter.

12. The actuator of claim 10, wherein the second diameter is smaller than a diameter of the ring.

13. The actuator of claim 10, wherein the first section defines an outer surface that is disposed against the seat.

14. The actuator of claim 13, wherein the second section defines an inner surface that is disposed on the ring.

15. The actuator of claim 10, wherein the component and the ring are rotatable relative to each other in a first direction and in a second direction opposite the first, wherein the first section exerts a first drag torque on the seat in response to relative rotation in the first direction and exerts a second drag torque on the seat, that is lower than the first drag torque, in response to relative rotation in the second direction.

16. The actuator of claim 15, wherein the second section exerts a third drag torque on the ring in response to relative rotation in the first direction and exerts a fourth drag torque on the ring in response to relative rotation in the second direction, wherein the fourth drag torque is larger than the third drag torque.

17. The actuator of claim 10, wherein the component is a hub of the PWG.

\* \* \* \* \*